United States Patent [19]
Ishigami et al.

[11] 3,754,792
[45] Aug. 28, 1973

[54] CONTROL VALVE ASSEMBLY

[75] Inventors: Noriakira Ishigami, Chiryu City; Massasi Ban, Kariya City, both of Japan

[73] Assignee: Aisin Seiki Kabushiki Kaisha, Kariya City, Aichi Pref., Japan

[22] Filed: Mar. 3, 1972

[21] Appl. No.: 231,463

[52] U.S. Cl.................. 303/6 C, 303/84 A, 188/349
[51] Int. Cl............................................. B60t 13/00
[58] Field of Search........................ 303/6 C, 84 A; 188/349

[56] References Cited
UNITED STATES PATENTS

| 3,597,014 | 8/1971 | Stokes | 303/6 C |
| 3,532,390 | 10/1970 | Bueler | 188/349 |
| 3,464,741 | 9/1969 | Falk | 303/6 C |
| 3,556,607 | 1/1971 | Shutt et al. | 188/349 |
| 3,586,384 | 6/1971 | Falk | 303/6 C |
| 3,597,008 | 8/1971 | Falk | 303/6 C |
| 3,597,015 | 8/1971 | Stokes | 303/6 C |
| 3,608,977 | 9/1971 | Kersting | 303/6 C |
| 3,614,169 | 10/1971 | Bueler | 188/349 |
| 3,667,810 | 6/1972 | Silagy | 303/6 C |
| 3,680,921 | 8/1972 | Falk | 303/6 C |

*Primary Examiner*—Allen N. Knowles
*Attorney*—Ralph E. Parker et al.

[57] ABSTRACT

A fluid pressure control system for a vehicle comprising front and rear brake cylinders, dual master cylinder having two distinct fluid chambers and a fluid pressure control valve assembly including means for directly delivering fluid pressure supplied from one of the fluid chambers of the dual master cylinder to the front brake cylinders, controlling means for delivering fluid pressure supplied from the other fluid chamber of the dual master cylinder to the rear brake cylinders at a lower rate than fluid pressure generated at the other fluid chamber of the dual master cylinder and means for directly delivering fluid pressure supplied from the other fluid chamber of the dual master cylinder to the rear brake cylinders in the event of hydraulic failure of the front brakes.

5 Claims, 5 Drawing Figures

Patented Aug. 28, 1973 3,754,792

Patented Aug. 28, 1973

CONTROL VALVE ASSEMBLY

BACKGROUND OF THE INVENTION

This invention relates generally to dual fluid pressure control system for a vehicle, and more particularly to a fluid pressure control valve assembly embodied therein.

In fluid pressure system for a vehicle having dual master cylinder for separate fluid circuits to front and rear brake cylinders, the fluid pressure control valve has heretofore been proposed for delivering fluid pressure conveyed, for instance, from one of the fluid pressure chambers of the dual master cylinder to the rear brake cylinder via one of the fluid circuits at a lower rate than fluid pressure generated in the same fluid chamber. Otherwise, the control valve has been used as a limiting valve which interrupts the flow of fluid pressure conveyed from one chamber of the dual master cylinder to the rear brakes when the fluid pressure has attained a predetermined value. However, such systems have the undesirable feature of drawhack whrein the fluid pressure control valve will continuously operate to control and reduce fluid pressure to the rear brake cylinders even upon failure of the other fluid circuit of the dual master cylinder. In case of such a hydraulic failure, it is required to make the control valve ineffective thereby to supply the maximum available fluid pressure to the rear brake cylinders so that the lack of the braking capacity can be compensated as much as possible.

SUMMARY OF THE INVENTION

Therefore, it is an object of the present invention to provide an improved fluid pressure control valve assembly adapted for obviating the aforementioned conventional drawback.

It is another object of the present invention to provide an improved fluid pressure control valve assembly wherein fluid pressure conveyed from one fluid chamber of the dual master cylinder is directly delivered to the rear brake cylinders without being controlled by the control valve upon failure of the other chamber of the master cylinder.

It is a further object of the present invention to provide an improved fluid pressure control valve assembly wherein upon hydraulic failure of the other fluid chamber of the master cylinder the fluid communication between the one chamber of the master cylinder and the rear brake cylinders will be attained without delay.

Briefly, one aspect of the invention comprises a normally closed valve member disposed in a by-pass passage means for connecting the other of the dual master cylinder to the other of the brake cylinders. The valve member is urged by a resilient means and the fluid pressure at the one of the dual master cylinder to close the by-pass passage means and is opened by the fluid pressure at the other of the dual master cylinder upon failure of the one of the brake cylinders.

BRIEF DESCRIPTION OF THE DRAWINGS

These and further objects, features and attendant advantages of the present invention will be more fully appreciated as the same becomes better understood from the following detailed description when considered in connection with the accompanying drawings wherein.

DETAILED DESCRIPTION OF THE INVENTION

Figure 1:
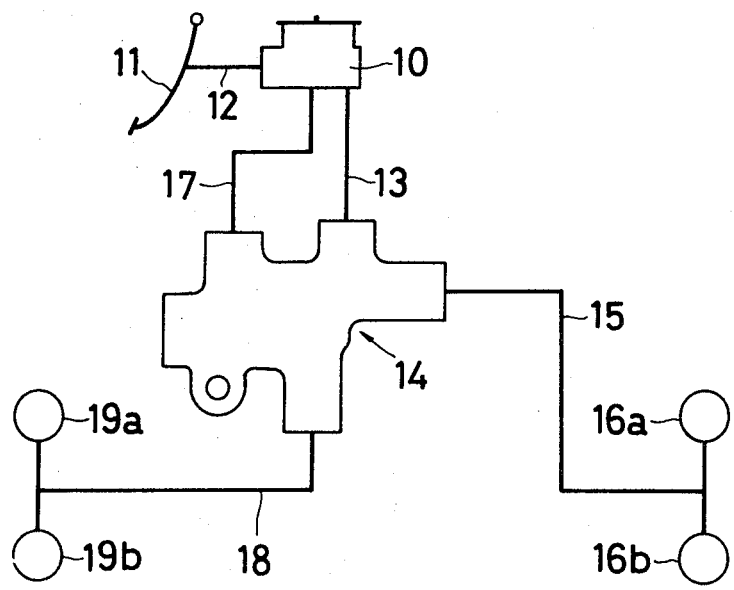
FIG. 1 is a generally schematic diagram representing a brake fluid pressure control system according to the present invention.

Referring now to the drawings and in particular to FIG. 1, a dual master cylinder 10 is mechanically connected to a brake pedal 11 through a push rod 12 to deliver brake fluid under pressure through a conduit 13 to a control valve assembly 14 and then to a pair of front brake cylinders 16a and 16b via a conduit 15. Fluid under pressure from the master cylinder 10 is also conveyed through a conduit 17 to the control valve assembly 14 and then to a pair of rear brake cylinders 19a and 19b via a conduit 18.

Figure 2:
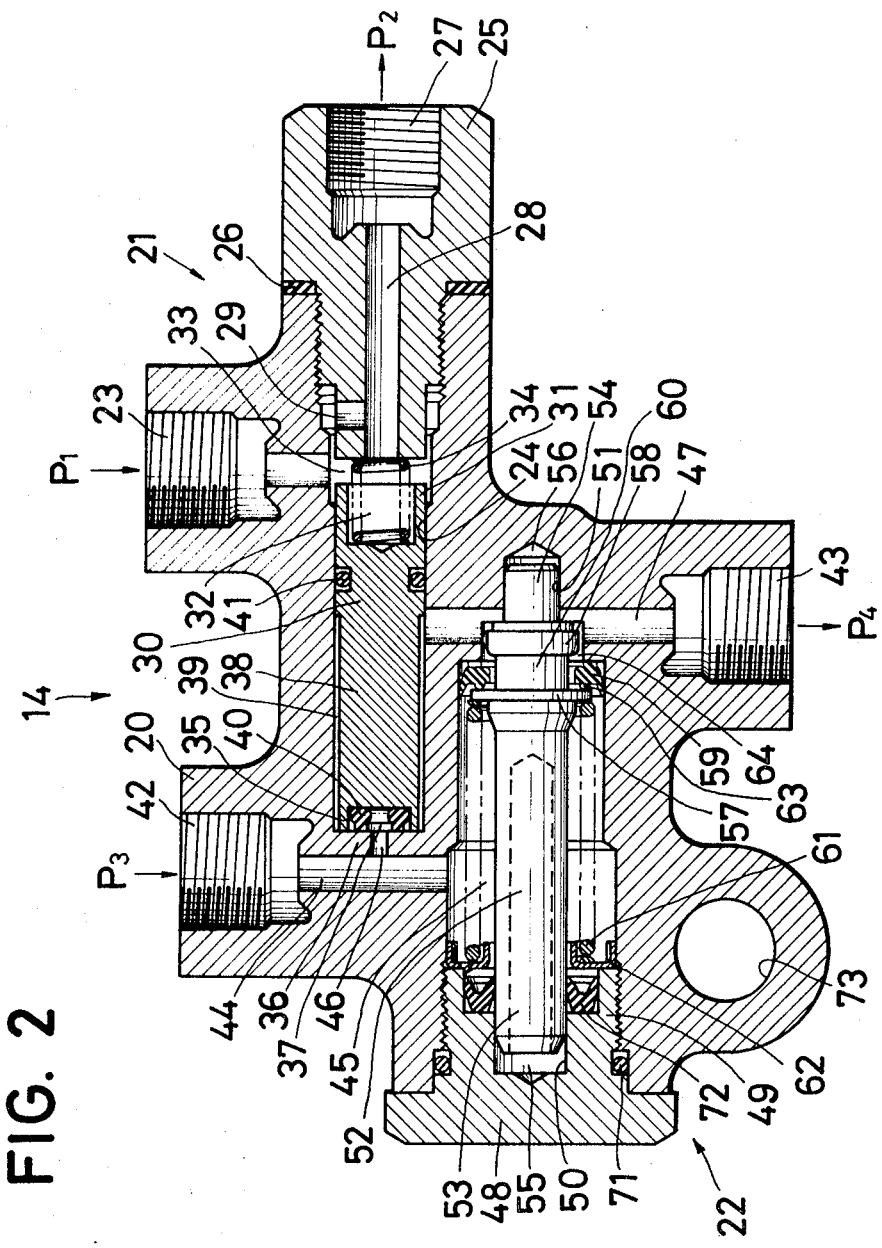
FIG. 2 is a sectional view showing a control valve assembly for use in the system of FIG. 1.
Figure 4:
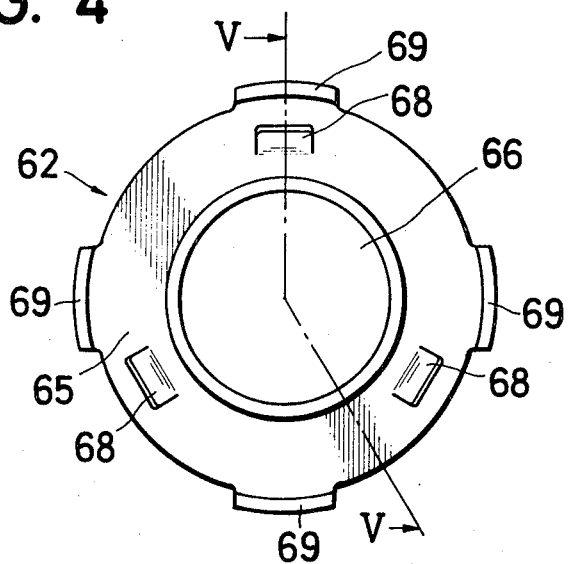
FIG. 4 is a front view showing on a relatively larger scale a retainer for use in the control valve assembly of FIG. 2.
Figure 5:
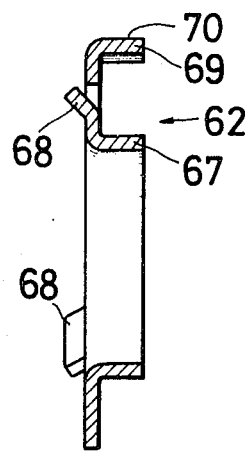
FIG. 5 is a sectional view taken along the line V — V of FIG. 4.

In FIG. 2, the control valve assembly 14 comprises a housing 20 which houses a fluid pressure passing assembly 21 and a proportioning valve assembly 22 therein. Thus, fluid under pressure to the front brake cylinders 16a and 16b is normally conveyed from the master cylinder 10 through the fluid pressure passing assembly 21 while fluid under pressure is conveyed from the master cylinder 10 through the proportioning valve assembly 22 to the rear brake cylinders 19a and 19b. The housing 20 is formed with an inlet port 23 arranged to introduce brake fluid pressure from the conduit 13 and communicated with a cylindrical bore 24 formed in the housing 20. At the right end of the bore 24 in FIG. 2, a plug 25 is screwed through a sealing member 26. The plug 25 has an outlet port 27 adapted to deliver brake fluid pressure to the conduit 15, an axial passage 28 connected to the outlet port 27, and a radial passage 29 connected to the passage 28. A piston 30 slidably mounted within the bore 24 and has a hollow cylindrical portion 31 at the right side thereof. The portion 31 is provided with a central blind cavity 32 which is open to hydraulic chamber 33 formed by the plug 25 and the piston 30 within the bore 24. Thus the inlet port 23 communicates with the outlet port 27 through the chamber 33 and the passages 29 and 28. The piston 30 is urged in the left direction in FIG. 2 by a compression spring 34 inserted between the left end portion of the plug 25 and the bottom end wall of the cylindrical portion 31 whereby a follow cylindrical portion 35 formed at the left side of the piston 30 is normally engaged with a shoulder 36 of the housing 20. The portion 35 is provided with a blind opening or chamber 37. The piston 30 further includes a reduced diameter portion 38 to define an annular chamber 39 sealed from the chamber 37 by a sealing or valve member 40 disposed within the chamber 27. The valve member 40 is of an annular configuration and made of a resilient member, such as rubber. The valve member 40 is extended outwardly from the cylindrical portion 35 in nature state and is pressed and contacted to the shoulder 36 of the housing 20 when the valve member 40 is assemblied in the control valve assembly 14. An O-ring seal 41 is fitted between the housing 20 and the piston 30 to prevent leakage therebetween. The housing 20 has an inlet port 42 connected to the conduit 17 and an outlet port 43 connected to the conduit 18. A passage means 44 is formed in the housing 20 for covering fluid pressure supplied to the inlet port 42 to a hydraulic chamber 45 and to the chamber 37 through a further passage 46, respectively. A passage means 47 formed in the housing 20 serves to connect the annular chamber 39 to the outlet port 43 and to connect the chamber 45 to the outlet port 43. The chamber 45 is formed by boring from the left end of the housing 20 which is threaded and closed by a plug 48. The plug 48 is provided with an extending annular flange 49 to form a blind bore 50. The housing 20 has a blind bore 51 disposed in axial alignment with the bore 50. The bores 50 and 51 serve to slidably support and guide a stepped piston or plunger 52 which has a cylindrical portion 53 of cross-sectional area $S_1$ guided in the bore 50 and a projection 54 guided in the bore 51 so that an atmosphere chamber 55 is formed between one end of the portion 53 and the plug 48 and a hydraulic chamber 56 is formed between the other end of the projection 54 of the piston 52 and the housing 20. The piston 52 has a radially extending annular flange 57 and an annular shoulder or valve head 58 of cross-sectional area $S_2$. A valve member 59 is disposed around a reduced portion 60 of the piston 52 between the flange 57 and the valve head 58. The piston 52 is biased rightwardly by a compression spring 61 one end of which is engaged with the flange 57 of the piston 52 and the other end of which is engaged with the right end of the flange 49 of the plug 48 through a retainer 62. Therefore, the flange 57 of the piston 52 is engaged with axial projections 63 formed on the valve member 59 and a passage 64 is connected to the chamber 45 and to the passage 47 under the inoperative condition of the valve. The retainer 62 is of a generally annular configuration as seen is FIGS. 4 and 5 and includes a base portion 65 formed with a hole 66 to receive the cylindrical portion 53 of the piston 52 therein, an inside annular brim 67 extended in an axial direction from the base portion 65 for guiding the spring 61, tongue portions 68 projected from the base portion 65 and supported and guided on the inside annular face of the flange 49 of the plug 48, the tongues 68 being provided at three places adjacent the hole 66 as viewed in FIG. 4, and guide portions 69 extended in the same direction as the brim 67 from the base portion 65 and provided with outer faces 70 fitted with the cylinder portion of the housing 20 which defines the chamber 45. The guide portions 69 are provided in four places, as viewed in FIG. 4, and serve to support and hold the retainer 62 concentrically with respect to said cylinder portion. An O-ring seal 71 and a sealing cup 72 are provided for prevention of leakage between the plug 48 and the housing 20 and between the flange 49 of the plug 48 and the piston 52, respectively. A hole 73 is provided at the housing 20 to secure the latter to the body of the vehicle (not shown).

Figure 3:
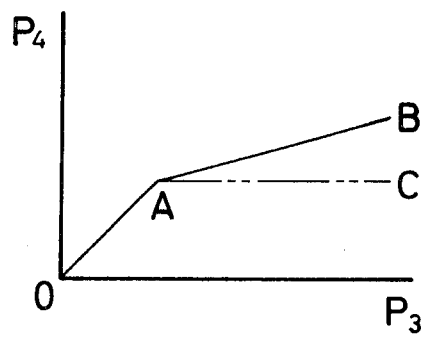
FIG. 3 is a graph diagrammatically representing the brake fluid pressure characteristics of the system of the present invention.

In operation, when the brake pedal 11 is initially depressed, fluid ander pressure is delivered from the master cylinder 10 through the conduits 13 and 17 to the inlet ports 23 and 42 of the control valve assembly 14, respectively. Fluid conveyed to the inlet port 23 is further delivered to the outlet port 27 via the chamber 33 and the passages 28 and 29 and then to the front brake cylinders 16a and 16b via the conduit 15. The hydraulic pressure applied is always equal, namely, the magnitudes of the fluid pressure $P_1$, $P_2$ at the inlet port 23 and the outlet port 27 are normally equal to each other. Fluid conveyed to the inlet port 42 is also delivered to the rear brake cylinders 19a and 19b via the passage 44, chamber 45, the gap between the valve member 59 and the flange 57 of the piston 52, the passages 64 and 47, the outlet port 43 and the conduit 18. The hydraulic pressure applied in this stage is illustrated in the graph of FIG. 3 along the line O-A wherein the magnitudes of the fluid pressure $P_3$, $P_4$ at the inlet port 42 and the outlet port 43 are substantially equal to each other until the fluid pressure attains a predetermined value A.

Assuming that $S_2$ is the effective cross-sectional area of the head 58 of the piston 52 which is brought into sealing engagement with the valve member 59, when the master cylinder pressure attains the predetermined value A with further pedal depression, the force acting on the area $S_2$ subjected to the fluid pressure $P_4$ at the outlet port 43 overcomes the force acting on the difference area between the piston portion 53 and the head 58 of the piston 52, namely the area $(S_2 - S_1)$, subjected to the fluid pressure $P_3$ at the inlet port 42 plus assisted by the compressive force of the spring 61. Therefore, the piston 52 is moved in the left direction, as viewed in FIG. 2, so that the valve head 58 seats with the valve member 59 to close the passage 64.

After the valve head 58 seats with the valve member 59 and the master cylinder pressure $P_3$ at the inlet port 42 is further increased, the increased force assisted by the spring 61 will act on the piston 52 against the force keeping the valve closed whereby the piston 52 will be moved rightwardly to reopen the passage 64. Thereafter, thus closing and opening of the passage 64 is repeated and therefore the fluid pressure $P_4$ at the outlet port 43 increases at a lower rate than the fluid pressure $P_3$ at the inlet port 42, as shown in FIG. 3 at the line A - B.

In the event of hydraulic failure in the system from master cylinder 10 to the front brake cylinders 16a and 16b, the value of fluid pressure $P_1$ acting on the piston 30 will be zero or approximate zero, so the piston 30 positioned as shown in FIG. 2 during the normal braking application is moved rightwardly by the fluid pressure $P_3$ at the chamber 37 against the compressive force of the spring 34. As the piston 30 is moved, the sealing member 40 is instantly unseated from the shoulder 36 of the housing 20 and thus the fluid pressure at the chamber 37 conveyed from the inlet port 42 via the passages 44 and 46 is delivered to the outlet port 43 via the annular chamber 39 and the passage 47, thereby completing a by-pass passage. In this stage, when the fluid pressure $P_3$ attains the predetermined value A, the piston 52 is pressed leftwardly by the fluid pressure at the passage 47 until the left end of the piston portion 53 reaches the plug 48 since the left end of the piston portion 53 is exposed to the atmosphere chamber 55. Thus, under this condition, the master cylinder pressure is directly delivered to the rear brake cylinders 19a and 19b wherein the magnitudes of the fluid pressure $P_3$, $P_4$ at the inlet port 42 and the outlet port 43 are substantially equal.

In the above-mentioned system, it is obviously possible to replace the proportioning valve assembly with the limiting valve assembly which interrupts the flow of fluid pressure delivered from the inlet port 42 to the outlet port 43 after the fluid pressure at the inlet port 42 attains the predetermined valve A, as viewed in FIG. 3 at the line A - C. In such a case, it is required to substantially equalize the respective cross sectional areas $S_1$ and $S_2$ of the portion 53 and the head 58 of the piston 52.

Various other modification and variations of the present invention are obviously possible in light of the above teachings. It is to be understood, therefore, that within the scope of the appended claims, the invention may be practiced otherwise than as specifically described therein.

What is claimed is:

1. A fluid pressure control system for a vehicle comprising a pair of fluid pressure responsive brake cylinders; dual fluid pressure generating means for delivering separate fluid pressure to said brake cylinders, respectively; a fluid pressure control valve assembly including first means fluidically connected to one of said dual fluid pressure generating means, second means fluidically connected to one of said brake cylinders, a first fluid chamber formed in a housing of said control valve assembly and fluidically connected to said first and second means, respectively, a first piston slidably mounted within said first chamber, a first valve means cooperating with said first piston for controlling fluid pressure communication between said first means and said second means, third means fluidically connected to the other of said dual fluid pressure generating means, fourth means fluidically connected to the other of said brake cylinders, a second fluid chamber formed in the housing and fluidically connected to said third and fourth means, respectively, a second piston slidably mounted within said second chamber and including a hollow cylindrical portion to define a third fluid chamber normally fluidically connected to said first means, a reduced diameter portion to define a fourth annular fluid chamber normally fluidically connected to said second means and an annular portion exposed to said second chamber, said second piston being exposed to the respective fluid pressures delivered from said dual fluid pressure generating means at both ends thereof, a by-pass passage means constituted between said first and second means, a second valve means disposed in said third fluid chamber and tightly connected to said second piston and a first resilient means for biasing said second piston in a direction whereby said by-pass passage means is normally closed by said second valve means and is opened in the event of hydraulic failure of a hydraulic system including the other chamber of said dual fluid pressure generating means.

2. A fluid pressure control system as set forth in claim 1, wherein said second valve means is an annular-shaped resilient member, said resilient member being extended outwardly from said hollow cylindrical portion in nature state thereof and being pressed to the inner surface of said housing for interrupting said by-pass passage means upon normally braking application.

3. A fluid pressure control system as set forth in claim 1 further comprising second resilient means for biasing said first piston in the opening direction of said first valve means.

4. A fluid pressure control system as set forth in claim 3, wherein said second resilient means is a compression spring one end of which is engaged with said first piston and at the other end of which is engaged with said housing through a retainer, said retainer including guide portions supported with respect to a cylinder portion of said housing to form said first chamber.

5. A fluid pressure control system as set forth in claim 4, wherein said retainer further comprises a hole adapted to pass said first piston therethrough, an annular extending portion for guiding said compression spring and tongue portions guided and supported on an annular projecting portion of said housing.

* * * * *